United States Patent

[11] 3,545,504

[72] Inventor Arthur M. Ferrari
     P.O. Box 315, Corning, California 96021
[21] Appl. No. 783,613
[22] Filed Dec. 13, 1968
[45] Patented Dec. 8, 1970

[54] MULTIPLE BAND SAW
     10 Claims, 3 Drawing Figs.
[52] U.S. Cl. ................................................. 143/22,
     83/201.13
[51] Int. Cl. ................................................. B27b 15/08
[50] Field of Search ........................................ 143/22, 26,
     17, 5; 83/201.13, 201

[56]         References Cited
        UNITED STATES PATENTS
2,755,856  7/1956  Clemens .................  83/201.13
3,318,347  5/1967  Alich .......................  143/22
             FOREIGN PATENTS
   8,821  5/1893  Great Britain ...............  143/22

Primary Examiner—Donald R. Schran
Attorney—Buckhorn, Blore, Klarquist and Sparkman ABSTRACT: A multiple band saw apparatus having a work supporting surface mounted in front of the band saw frames, said surface having open transverse guideways therethrough in which slotted table members attached to the band saw frames and supporting the saw bands can slide during transverse adjustment of the band saw frames with respect to the work supporting surface.

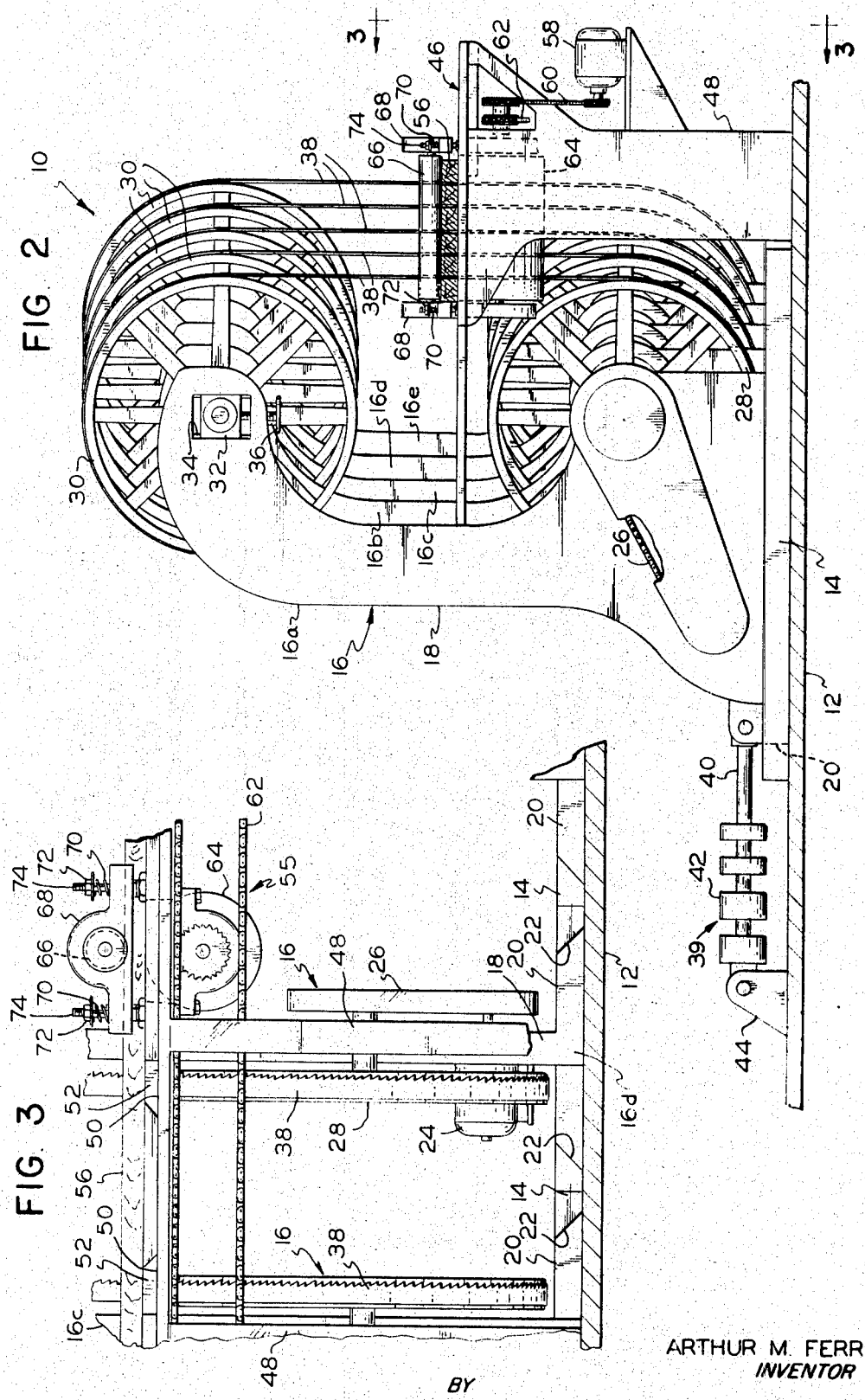

MULTIPLE BAND SAW

BACKGROUND OF THE INVENTION

This invention relates to multiple band saw apparatus, and more particularly, to such apparatus in which the positions of the saws are transversely adjustable with respect to the support or carriage on which the work is placed.

The primary object of my invention is to provide a multiple band saw apparatus having a plurality of band saw mills mounted thereupon, each of which mills can be moved transversely with respect to the work support, thereby to permit cuts of different and varying widths or thicknesses to be made at a single travel.

It is a further object of the present invention to provide such a multiple band saw apparatus that will be particularly suitable for use with automatic controls which can adjust the transverse positions of the saw bands quickly, efficiently and precisely.

These objects are achieved by the present invention which provides a multiple band saw apparatus having open transverse guideways through the work supporting surface, in which transverse guideways slotted table portions attached to the band saw frames and supporting the saw bands can slide during transverse adjustment of the band saw frames.

My invention consists in the combination and arrangement of parts herein set forth and illustrated in the accompanying drawings from which the several features and advantages attained thereby will be readily understood by those skilled in the art.

BRIEF DESCRIPTION OF THE DRAWINGS

Referring to the drawings wherein like reference characters designate like parts throughout the several views.

FIG. 2 is a side elevational view of the apparatus illustrated in FIG. 1; and

FIG. 3 is a sectional view to an enlarged scale taken on line 3–3 of FIG. 2.

DESCRIPTION OF THE PREFERRED EMBODIMENT

Figure 1:
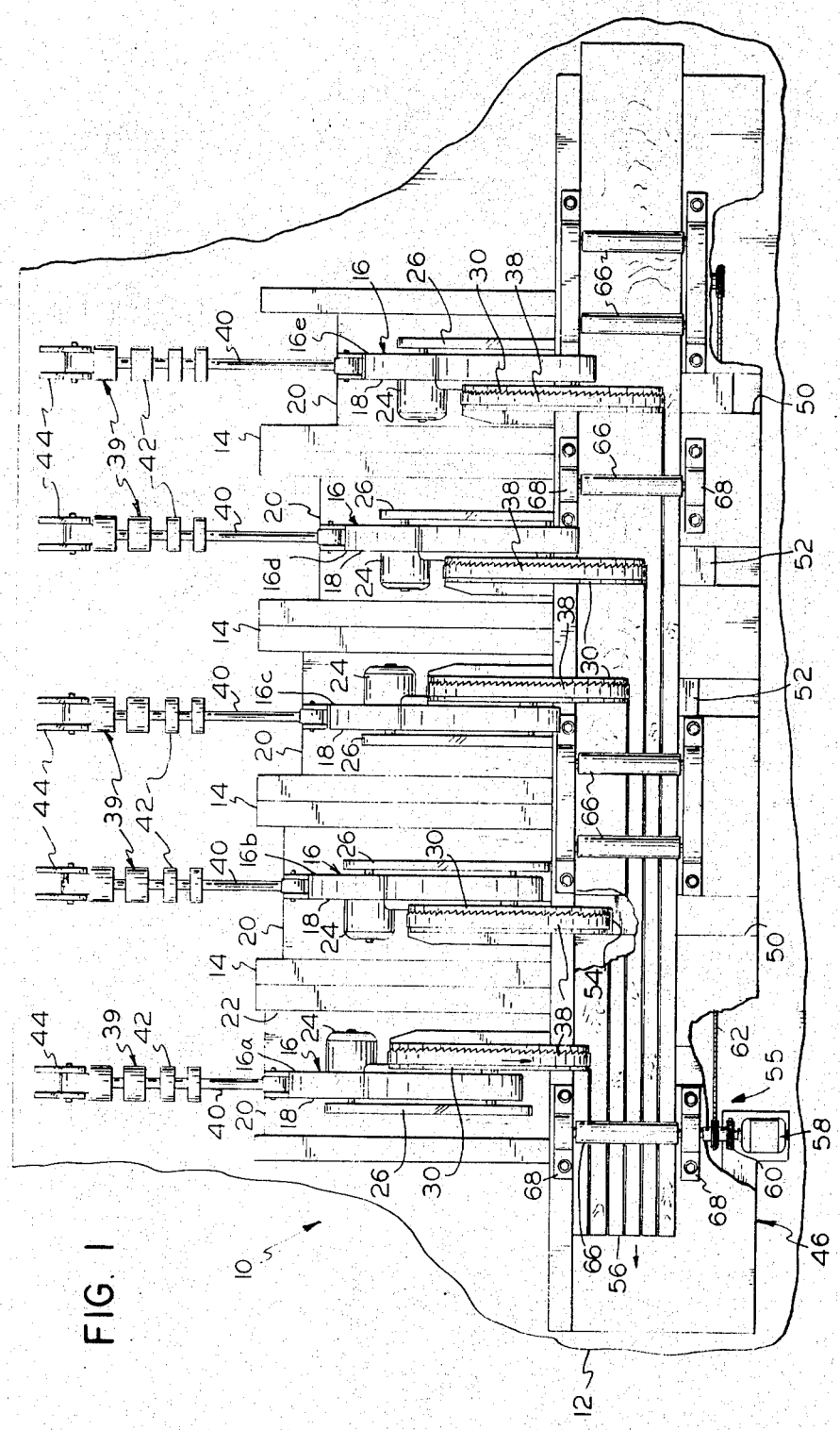
FIG. 1 is a plan view of a multiple band saw apparatus constructed in accordance with the present invention.

Referring again to the drawings, the apparatus 10 of the invention consists of a base or bedplate 12 on which are mounted a plurality of ways 14, in each of which a band saw mill 16 is adapted to slide. Each mill 16 comprises a band saw frame 18 mounted on a base 20 provided with a guide 22 receivable in a way 14 and slidable with respect thereto. Each guide 22 is dovetailed with respect to its associated way 14 to eliminate vertical movement with respect thereto. A motor 24 is mounted on each frame 18. Each of the motors 24 supplies motive power through a chain drive 26 to drive a driven wheel 28 mounted on the lower portion of each band saw frame 18. An idler wheel 30 is carried by the upper portion of each band saw frame 18, being vertically adjustable with respect thereto by means of a bearing 32 slidably mounted in a slot 34 in the frame 18 and adjustable in the vertical direction by means of a set screw 36. A saw band 38 is entrained around the two wheels 28 and 30 in the usual manner.

Setworks 39 in the form of pistons 40 and cylinders 42 attached to a bracket 44 are attached to the rear of each of the bases 20 independently to move each of the frames 18 in the ways 14. Automatic control means (not shown) are connectable to the setworks 39 so that the transverse positions of the mills 16 with respect to the bedplate 12 can be adjusted quickly and precisely thereby to make the multiple cuts desired.

An elongated, horizontal work support 46 is mounted on a plurality of stanchions 48 on the bedplate 12 in front of the band saw frames 18. The support 46 has open transversely extending guideways 50 spaced along it, one such guideway 50 being positioned in front of each saw band 38. Each band saw frame 18 also has mounted on it a slotted table member 52, the respective saw band 38 for each such frame passing through a slot 54 in the member 52, thereby to gain support therefrom. Each member 52 fits in its respective guideway 50, being able to slide in and with respect thereto in response to movement of the frame 18 to which it is attached. Each member 52 is dovetailed with respect to its associated guideway 50 to eliminate relative vertical movement with respect thereto.

It is thus obvious that the ways 14 which are positioned below the work support 46 extend parallel to the guideways 50. The guides 22 on each band saw frame 18, which can slide in the ways 14, thus move with and parallel to the slotted table portions 52, which slide in the guideways 50, when the frames 18 are moved transversely with respect to the support 46. The course of each of the saw bands 38 thus passes through member 52 and between guideways 50 as the bands travel around the wheels 28 and 30.

The work support 46 is provided with conveyor means 55 for advancing a board 56 therealong. Such means comprise a motor 58 which furnishes motive power to a vertical chain drive 60 and thence to a horizontal chain drive 62. The latter rotates a plurality of lower rollers 64, the upper surfaces of which extend slightly above the surface of the work support 46 in between the guideways 50 to move the board 56 through the multiple saw bands 38 by contacting the lower surface thereof. A plurality of upper rollers 66 are mounted in bearings 68 and urged into contact with the upper surface of board 56 by springs 70 which react against nuts 72 on bolts 74. The board 56 is thus seen to pass between rollers 64 and 66, being gripped thereby and advanced along the support 46 through the saw bands 38.

In the embodiments shown, band saw mills 16a and 16b are mounted so that their respective saw bands 38 face each other; mills 16b and 16c are mounted back to back; mills 16c and 16d are mounted face to face; and mills 16d and 16e are mounted with their respective saw bands 38 facing in the same direction. Thus adjacent pairs of band saw frames are mounted with their saw bands in face-to-face relation. This manner of mounting maintains the respective saw bands as close together as possible and minimizes the number of rollers that are required.

In the foregoing description, the invention has been described with reference to a certain particular preferred embodiment, although it is to be understood that the specific details shown are merely illustrative and that the invention may be carried out in other ways without departing from the true spirit and scope of the following claims.

I claim:

1. In a multiple band saw apparatus:
   an elongated, horizontal work support having open transverse guideways spaced therealong;
   conveyor means for advancing a board along the work support;
   base means supporting the support and having a plurality of ways below the support and extending parallel to said transverse guideways;
   a plurality of band saw frames having base portions provided with guides slidable in said ways;
   said band saw frames also having slotted table members fitting slidably in said guideways and movable with respect thereto;
   a plurality of saw bands;
   a plurality of pairs of wheels carried by said frames and mounting said saw bands in positions having courses passing through said slotted table members and said transverse guideways in said work support;
   a plurality of motor means carried by said frames for driving said wheels;
   a plurality of motor means carried by said frames for driving said wheels;
   and a plurality of setworks means carried by said base means and connected to said frames for selectively positioning said frames along said ways.

2. The multiple band saw apparatus of claim 1 in which said base means comprise a bedplate and a plurality of stanchions mounted on said bedplate in front of said band saw frames, said horizontal work support being mounted on said stanchions.

3. The multiple band saw apparatus of claim 1 in which said open transverse guideways are positioned one in front of each saw band.

4. The multiple band saw apparatus of claim 1 in which each of said guides for said base portions of said band saw frames is dovetailed with its respective way.

5. The multiple band saw apparatus of claim 1 in which each of said slotted table members on said band saw frames is dovetailed with respect to the respective transverse guideway in said work support in which said member fits to eliminate relative vertical movement with respect thereto.

6. The multiple band saw apparatus of claim 1 in which adjacent pairs of band saw frames are mounted on said base means with their respective saw bands in face-to-face relation.

7. The multiple band saw apparatus of claim 1 in which said conveyor means comprise a plurality of lower rollers mounted beneath the upper surface of said horizontal work support, said lower rollers being adapted to contact the lower surface of said board, a plurality of upper rollers mounted above said upper surface of said work support, spring means to bias said upper rollers against the upper surface of said board to cause said board to be gripped between said lower and upper rollers, and means to drive said lower rollers to advance said board along said work support.

8. The multiple band saw apparatus of claim 7 in which said lower rollers are positioned in between said transverse guideways in said work support.

9. The multiple band saw apparatus of claim 7 in which the upper surfaces of said lower rollers extend slightly above the surface of said work support to contact the lower surface of said board.

10. In a multiple band saw apparatus:
elongated conveyor means including a plurality of conveyor rolls mounted in spaced groups having openings therebetween;
base means having a plurality of parallel ways extending transversely of said conveyor means;
a plurality of band saw frames having base portions provided with guides slidable in said ways and also having slotted table portions extending into said openings;
a plurality of saw bands;
a plurality of pairs of wheels carried by the frames and mounting said saw bands in positions having courses passing through the slots in said table portions;
a plurality of motor means carried by the frames for driving the wheels;
and a plurality of setworks means carried by the base means for selectively positioning the frames along said ways.